(12) United States Patent
Rödhammer

(10) Patent No.: US 7,762,448 B2
(45) Date of Patent: Jul. 27, 2010

(54) PROCESS FOR PRODUCING A COMPOSITE BODY

(75) Inventor: Peter Rödhammer, Ehenbichl (AT)

(73) Assignee: PLansee SE, Reutte/Tirol (AT)

( * ) Notice: Subject to any disclaimer, the term of this patent is extended or adjusted under 35 U.S.C. 154(b) by 150 days.

(21) Appl. No.: 10/574,515

(22) PCT Filed: Sep. 29, 2004

(86) PCT No.: PCT/AT2004/000032

§ 371 (c)(1),
(2), (4) Date: Apr. 3, 2006

(87) PCT Pub. No.: WO2005/034168

PCT Pub. Date: Apr. 14, 2005

(65) Prior Publication Data

US 2007/0119907 A1    May 31, 2007

(30) Foreign Application Priority Data

Oct. 3, 2003  (AT) .......................... GM677/2003 U

(51) Int. Cl.
*B23K 31/02*   (2006.01)
*H01J 35/10*   (2006.01)

(52) U.S. Cl. ..................... 228/122.1; 228/120; 228/121; 228/262.7; 228/262.9; 428/634; 428/635

(58) Field of Classification Search ................. 228/120, 228/121, 122.1, 262.7, 262.9; 428/634, 635; 378/143, 144
See application file for complete search history.

(56) References Cited

U.S. PATENT DOCUMENTS 2,667,431 A * 1/1954 Burnside ..................... 427/11

(Continued)

FOREIGN PATENT DOCUMENTS

AT    005 079 U1    3/2002

(Continued)

OTHER PUBLICATIONS

XP-002065543 "Active Metal Brazing for Joining Ceramics to Metals", (Foley, et al.), Technical Review GEC Alsthom, dated Feb. 13, 1994.

(Continued)

*Primary Examiner*—Jessica L Ward
*Assistant Examiner*—Devang Patel
(74) *Attorney, Agent, or Firm*—Laurence A. Greenberg; Werner H. Stemer; Ralph E. Locher

(57) ABSTRACT

A composite body which can withstand high thermal stresses is formed by high-temperature soldering at least a part of a high-temperature-resistant, metallic or nonmetallic component and at least a part of a high-temperature-resistant, nonmetallic component. Prior to soldering, a metallic barrier layer, which is impervious to the solder melt, of one or more elements selected from the group consisting of V, Nb, Ta, Cr, Mo, W, Ti, Zr, Hf and alloys thereof, is deposited on that surface of each nonmetallic component which is to be soldered. Solder material, barrier layer and soldering conditions are adapted to one another in such a manner that during the soldering operation the metallic barrier layer remains at least partially in the solid state, so that after the soldering operation it is still present in a thickness of at least 10 μm at least over the majority of the soldering surface.

18 Claims, 3 Drawing Sheets

U.S. PATENT DOCUMENTS

Figure 1A:
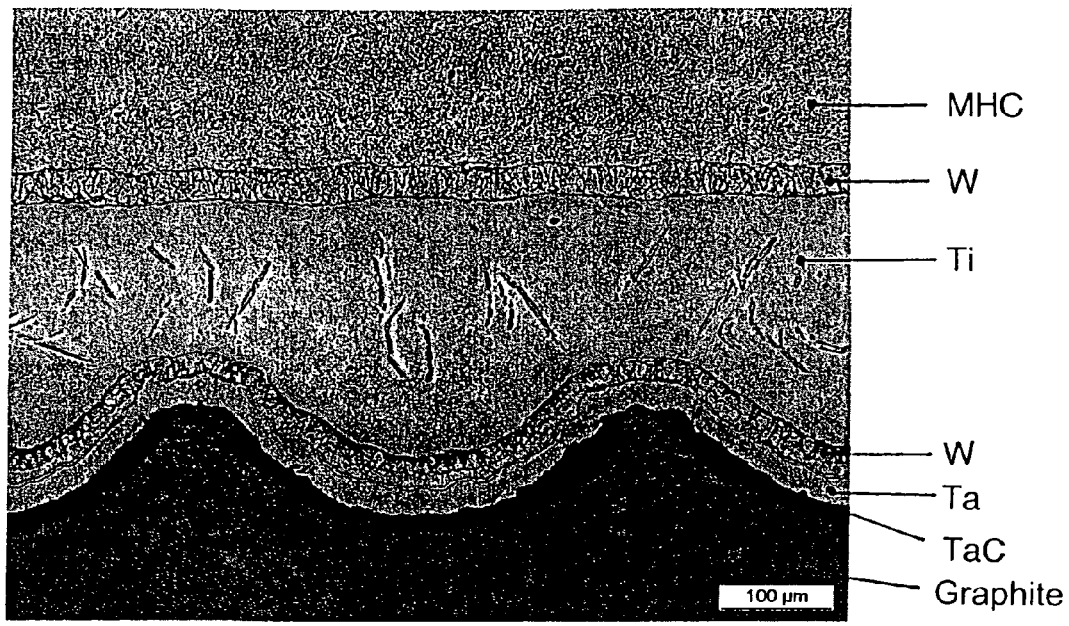

| | | | |
|---|---|---|---|
| 3,055,465 A * | 9/1962 | Pulfrich | 403/30 |
| 3,518,066 A * | 6/1970 | Hughes et al. | 428/633 |
| 3,710,170 A | 1/1973 | Friedel | |
| 4,567,110 A | 1/1986 | Jarvinen | |
| 5,001,019 A | 3/1991 | Ito et al. | |
| 5,102,747 A | 4/1992 | Kneringer et al. | |
| 5,122,422 A * | 6/1992 | Rodhammer et al. | 428/634 |
| 5,904,287 A | 5/1999 | Tashiro et al. | |
| 6,400,800 B1 * | 6/2002 | Warren | 378/144 |
| 2002/0158112 A1 | 10/2002 | Rödhammer | |
| 2003/0006269 A1 | 1/2003 | Horner et al. | |
| 2003/0141345 A1 * | 7/2003 | Shinkai et al. | 228/122.1 |

FOREIGN PATENT DOCUMENTS

| | | |
|---|---|---|
| EP | 0 333 149 A2 | 9/1989 |
| EP | 0 333 149 A3 | 9/1989 |
| GB | 999 818 | 7/1965 |
| JP | 4228480 A | 8/1992 |
| JP | 7053277 A | 2/1995 |
| SU | 1742269 A1 * | 6/1992 |

OTHER PUBLICATIONS

"Development and Heat Load Experiments of Graphite Brazed to Stainless Steel for the Fist Wall Structure of FER", (Ioki, et al.), Fusion Engineering and Design, Elsevier Science Publishers, dated May 1, 1989.

Japanese Office Action dated Nov. 13, 2008.

* cited by examiner

PROCESS FOR PRODUCING A COMPOSITE BODY

BACKGROUND OF THE INVENTION

Field of the Invention

The invention relates to a process for producing a composite body which can withstand high thermal stresses, in which process at least part of a high-temperature-resistant, metallic or nonmetallic component and at least part of a high-temperature-resistant, nonmetallic component are joined to one another by high-temperature soldering.

Composite bodies which comprise a combination of a plurality of high-temperature-resistant nonmetallic components, e.g. ceramic or carbon-containing materials, optionally together with high-temperature-resistant, metallic materials, are in widespread use in high-temperature engineering. Composites of this type are used, inter alia, in the aeronautical and aerospace industry, in power engineering, in illumination engineering, in high-temperature furnace construction and in X-ray diagnostics. If material pairings of this type are soldered together, as is frequently the case, it should be taken into account that nonmetallic materials, for manufacturing reasons, are in many cases porous, with an open porosity range of up to 15%.

At the high soldering temperatures used to produce the composite bodies, the solder material generally reacts with the materials of the components to be soldered, specifically on account of the materials being partially dissolved by the solder melt for a relatively short period of time and on account of diffusion brought about by the heating, holding and cooling to, at and from the soldering temperature over a considerably longer period of time. In some cases, this leads to positive side-effects, for example to an increase in what is known as the remelting temperature (the exceeding of the liquidus line when the temperature is being ramped up) as a measure of the maximum temperature of use. Generally, however, this also has disadvantageous effects on the properties of the alloyed solder layer formed and/or the components affected by the reaction with the solder. In particular, undesirable reactions may occur between the solder and constituents of the nonmetallic joining partner, for example in the case of a Ti or Zr solder, carbides can be formed or gaseous compounds, such as for example CO, may be evolved.

If the soldered composite bodies are used at high temperatures, the mixing process caused by diffusion continues to progress, with in particular elements with a high diffusion rate (C, N, Si, B, Ti, etc.) diffusing from the joining partners into the solder or vice versa which can lead to rapid aging (embrittlement, pore formation) of the materials affected.

By way of example, in the case of soldering using Ti (melting point approx. 1670° C.), soldering temperatures of between 1700° C. and 1750° C. are generally set. By way of example, if Mo is used as metallic component, in this case a solder layer comprising a Mo/Ti solid solution is formed, with a remelting temperature that is approximately equal to the soldering temperature. Depending on the soldering temperature, the Mo content in the Ti melt is between 5 atomic % and 10 atomic %. In the case of soldering Mo alloys using titanium solder, the Ti melt also partially dissolves the alloying partners (e.g. Zr, Hf, C and O in the case of the Mo alloy MHC). If graphite is used as nonmetallic component, the Ti melt dissolves considerable amounts of C (approx. 1.5 atomic %) out of the graphite, and this C is deposited at the interface with the graphite in the form of carbides in the solder or as a carbide layer (typical thickness of the TiC interfacial layer with the graphite after soldering 30-40 μm).

This carbide layer significantly impedes the heat transport and reduces the strength of the composite on account of its materials properties (high modulus of elasticity, very low notch impact strength).

In the case of various solder materials, in particular in the case of Zr and Ti, infiltration of the porous graphite occurs, with the result that a metal skeleton and shortly afterward a carbide skeleton is formed in the graphite. In particular after thermal cycling, this infiltration zone constitutes a weak point in the high-temperature resistance of the composite bodies.

In the case of composite bodies which are produced by soldering, the uncontrolled formation of voids in the solder zone often constitutes a problem that has not yet been resolved. These voids are often spherical micropores with diameters of up to the thickness of the solder zone which forms (typically 50-150 μm), and are in some cases larger flat bubbles with an extent of up to a few millimeters. As a result, the good heat transfer between metal and graphite which is generally required for use is impeded, and the strength of the join is also reduced. Accumulations of micropores or relatively large individual voids therefore lead to scrap.

According to current opinion, two causes are responsible for the formation of the voids. On the one hand, the micropores are formed as a result of the inclusion of gas bubbles in the solidifying melt. Under a high vacuum, gases can form as a result of desorption from the interior of the graphite (as CO or $CH_x$), but also as a result of dissolution of C and/or O out of the metal or the graphite into the solder metal with subsequent evolution in the form of CO. This problem occurs to an increased extent in the case of relatively recent dispersion-strengthened Mo alloys as metallic component, such as for example MHC, with its considerably higher O and C contents. On the other hand, the macroscopic voids are predominantly attributable to solder deficiencies caused by the solder seeping into the graphite of varying porosity.

DE-A 21 18 425 describes a composite body which can be highly thermally stressed, in the form of a rotating anode for X-ray tubes. One or more parts made from graphite are soldered to a round metallic base body predominantly comprising molybdenum, with hafnium or zirconium, by way of example, being used as solder material. The surface of the metallic base body, prior to the soldering operation, is in this case provided with a 0.1-1 mm thick layer of tantalum or tungsten in order to avoid eutectic melting reactions of the metallic base body with the solder material. One drawback of this is that voids in the solder caused by desorption of gases out of the graphite and embrittlement of the soldered join caused by the dissolution of C out of the graphite cannot be prevented.

EP 0 399 621 B1 describes a composite body comprising graphite and a carbide-forming high-melting metal component, an interlayer comprising at least five individual layers being arranged between graphite and metal component. Adjacent to the graphite, the interlayer comprises a first individual layer made from a metal that does not form carbides. This layer is followed by at least two double layers, a double layer comprising an individual layer of one or more carbide-forming metals or the carbides or mixed carbides thereof, and an individual layer of a metal that does not form carbides, or its alloys. This interlayer is typically produced using 9-13 individual layers, with individual layer thicknesses of between 2-5 μm, and serves primarily as a diffusion barrier layer between the graphite and the high-melting metal component, which is preferably applied using a coating process. One drawback of this arrangement is that an interlayer of this type, on account of the multiplicity of individual layers and the associated thin layer thicknesses, is dissolved over a large number of individual layers by the solder melt during production of a composite body that is produced by high-temperature soldering, thereby largely cancelling out the barrier action of this interlayer with respect to diffusion of carbon out of the graphite. This in turn increases the probability of the formation of voids in the solder. Also, it is uneconomical for the individual layers, which consist of expensive non-carbide-forming metals, such as Re, Ir, Ru or Pt, to be sacrificed as a result of being dissolved in the solder melt, while at the same time losing their function.

AT utility model 5.079 describes a process for producing a component composite by joining individual components made from nonmetallic and metallic high-temperature materials. Prior to the joining of the individual components, a gastight metal foil with a thickness of from 10 to 2000 µm is applied to the surface of the nonmetallic component by a canning process followed by subsequent die pressing or isostatic pressing. The process is primarily designed to produce composite components with coolant passages which are supposed to be sealed off with respect to the cooling medium flowing through them by the metal foil. The individual components of the composite components, following the canning of the nonmetallic component, are advantageously welded together or joined to one another in a common can by hot pressing or hot isostatic pressing. In addition, although soldering is mentioned as a possible process for joining the individual components, the limited utility of this joining process on account of the possibility of the metal foil being dissolved by the solder melt is pointed out.

A fundamental drawback of this process for producing a composite component is that the metal foil is present not just at those surfaces of the nonmetallic components which are to be joined, but also on all the other surfaces and, depending on the use of the composite component, may under certain circumstances have to be removed from these surfaces again.

SUMMARY OF THE INVENTION

Therefore, the object of the present invention is that of providing an economical process for producing a composite body which can be subjected to high thermal stresses and is made from nonmetallic or metallic and nonmetallic components, by means of high-temperature soldering, in which the strength and resistance to aging of the composite are increased compared to the prior art and the probability of the occurrence of defects in the soldered join, in particular including the formation of voids in the soldering zone, is considerably reduced as far as possible irrespective of the nature of the joining partners. At the same time, the soldering process is to be simplified and is to be suitable for joining a multiplicity of material combinations made up of a plurality of high-temperature-resistant nonmetallic components optionally in conjunction with high-melting, metallic components using commercially available solder materials, with soldered joins which are substantially independent of the specific combinations of materials used.

According to the invention, this object is achieved by virtue of the fact that prior to the soldering operation, a metallic barrier layer, which is impervious to the solder melt, of one or more elements selected from the group consisting of V, Nb, Ta, Cr, Mo, W, Ti, Zr, Hf and alloys thereof, is deposited on that surface of each nonmetallic component which is to be soldered, and in that solder material, barrier layer and soldering conditions are adapted to one another in such a manner that during the soldering operation the metallic barrier layer remains at least partially in the solid state, so that after the soldering operation it is still present in a thickness of at least 10 µm at least over the majority of the soldering surface.

The metallic barrier layer is in this case deposited, using coating processes which are known per se, in such a way as to be substantially impervious to gases and solder melt. The composition of the barrier layer and its thickness are selected in such a way, with reference to known two-component or multi-component phase diagrams, that under soldering conditions the layer is sufficiently stable with respect to dissolution by the solder melt and with respect to reactions with the respective nonmetallic component. The term sufficiently stable means that after the soldering process has ended, the metallic barrier layer is still continuously present in a residual thickness of at least 10 µm over by far the majority of the soldering surface between the surface of the nonmetallic component and solder layer.

The process according to the invention, by eliminating or reducing foreign phases, in particular brittle foreign phases, such as for example carbides, in the region of the soldered join improves the heat transfer between the individual, nonmetallic and/or metallic components, and ensures that the soldered join is able to withstand thermal cycling throughout the service life of the composite body. From an economic perspective, the process according to the invention eliminates considerable risks of scrap in the production of a perfect soldered join caused by manufacturing technology related fluctuations in the porosity and the presence of gases in the nonmetallic components.

All metals which are suitable for use at high temperatures, in particular the high-melting metals Ti, Zr, Hf, V, Nb, Ta, Cr, Mo, W and Re and alloys and compounds thereof, are suitable as the base material for the metallic component to be soldered.

The nonmetallic components comprise all nonmetallic materials of the current state of the art which are suitable for use as a heat sink, temporary heat accumulator and/or heat radiator, in particular graphite, diamond, carbon fiber reinforced carbon, SiC, C—SiC, $B_4C$, AlN and $Si_3N_4$ although without any restriction to the abovementioned materials being implied.

The material for the barrier layer is selected according to the nonmetallic component to be coated and the solder material, in such a manner that at the soldering temperature no melting reaction, or only a melting reaction which is limited to a small proportion of the layer thickness, with the nonmetallic component takes place. Furthermore, the barrier layer should be such that it can be thoroughly wetted by the solder melt but only limited melt reaction with the solder melt occurs. In making the selection, it should also be ensured that diffusion reactions which are disadvantageous for the materials properties are avoided as far as possible in use.

The materials which are used to coat the nonmetallic components are therefore selected with a view to the melting point or melting range and with a view to the microstructural properties of the two-component or multi-component system which is produced between solder material and metallic barrier layer under soldering conditions.

It will be clear that the desired function of the barrier layer can only be provided if the melting point of the barrier layer is above the soldering temperature, and therefore the use of the same materials for barrier layer and solder material is ruled out.

It is crucial to the concept of the invention that the solid barrier layer/solder melt and barrier layer/nonmetallic component phase boundary, which is formed by the metallic barrier layer, during the soldering operation.

This makes it possible to solder even very different materials under process conditions which are as far as possible constant and in all these cases to achieve substantially the same composition of the solder and the same solder structure.

It has proven surprising to a person skilled in the art that, despite the melting of the solder not occurring simultaneously, on account of temperature gradients within the components, and despite material being transported through convection within the solder melt, the dissolution of the barrier layer by the solder melt is reduced to a few percent precisely parallel to the surface of the coated component, with the result that even with relatively thin barrier layers with thicknesses in the range from approximately 15-30% of the solder thickness, a reliable barrier action with respect to the solder melt can be ensured. Only then was the precondition for converting the concept of the invention into an economic and reproducible soldering process satisfied.

The following table lists exemplary combinations of materials for the barrier layer and the solder material which have proven suitable for the soldering of graphite to molybdenum-based alloys in accordance with the invention. The solder thicknesses referred to in the table represent a standard range for the soldering of planar parts. If for specific reasons, such as for example component geometry, greater solder thicknesses are required or lower solder thicknesses are permitted, the thicknesses of the barrier layer can be adapted accordingly on the proviso that it remains impervious to the solder melt. All parameters in the table (layer thicknesses, soldering temperatures) are given by way of example on the basis of commercially available high-performance graphites with the associated porosity, surface quality and reactivity and on the basis of the temperature control of commercially available soldering furnaces. They therefore merely constitute examples of a very large number of possible ways of implementing the invention. A person skilled in the art will be able to establish guidelines for the selection of parameters for other combinations of materials without difficulty from the description of the invention.

with solder flowing out to be suppressed to such an extent that in many cases there is no need for any remachining of the soldered composite body.

The voids which occur in the solder despite using more than double the quantity of solder with standard soldering are effectively suppressed. Scrap caused by voids is virtually eliminated.

The microporosity produced by evolution of gases out of the nonmetallic component is reduced by approximately a factor of 10.

The following advantageous effects occur when using a C-containing material for the nonmetallic component(s).

The carbide formation at the interface with the carbon-containing component is prevented or reduced by approximately a factor of 10.

The thermal conductivity of the soldering zone rises on account of the absence or reduction of the carbide layer and the porosity.

The decrease in the strength of the soldered join caused by the formation of carbides during the soldering process is slowed down by more than a factor of 100.

For solders with a solder/carbon eutectic, according to the invention the remelting temperature increases, by approx. 30° C. in the case of Ti solder and by approx. 50° C. in the case of Zr solder.

The thickness of the metallic barrier layer depends, inter alia, on the quantity of solder, the uniformity with which the solder is distributed, any residual porosity which may be present in the barrier layer and any dissolution of the barrier layer which may be caused by the solder melt. In this context, it should in particular be borne in mind that even when certain nonmetallic components come into contact with the material of the barrier layer under the prevailing soldering conditions, a low-melting eutectic may form, with the result that the barrier layer could be dissolved to a considerable extent.

In its simplest form, the process according to the invention comprises applying a single-component metal layer to the nonmetallic components as barrier layer for the solder melt.

| Interlayer | Interlayer thickness µm | Barrier layer | Barrier layer thickness µm | Soldering foil | Soldering foil thickness µm | Dividing layer | Dividing layer thickness µm | Soldering temperature °C. | Solidification temperature °C. |
|---|---|---|---|---|---|---|---|---|---|
|  |  | W | 50 | Ti | 100 |  |  | 1720 | approx. 1680 |
|  |  | W | 50 | Zr | 100 |  |  | 1780 | 1735 |
|  |  | W | 30 | Pt | 30 |  |  | 1810 | 1800 |
|  |  | Mo | 40 | Ti | 100 |  |  | 1720 | approx. 1695 |
|  |  | Nb | 40 | Ti | 100 |  |  | 1720 | approx. 1710 |
|  |  | Ta | 30 | Ti | 40 |  |  | 1700 | approx. 1680 |
|  |  | W | 50 | Ni | 50 |  |  | 1500 | approx. 1490 |
|  |  | Ta + Ti | 50 + 2 | Cu | 50 |  |  | 1140 | approx. 1120 |
| Re | 20 | W | 30 | Ti | 100 | W | 30 | 1720 | approx. 1680 |
| TaC | 10 | W | 50 | Zr | 100 |  |  | 1780 | 1735 |

The advantageous effects of the metallic barrier layer combine synergistically which to such an extent was also not predictable by a person skilled in the art. The following list of the cooperating advantageous effects is intended to illustrate this synergy.

The impervious metallic barrier layer means that the solder cannot infiltrate the nonmetallic component. Therefore, 50-150 µm thick solder foils can be used instead for example of 200-300 µm thick solder foils.

The improved solder quantity management allows the uncontrolled wetting of the components to be soldered In the case of graphite as nonmetallic component and molybdenum as metallic component, W and Ta are preferably suitable. If a Ti solder foil with a thickness of 100 µm is used, a 30-40 µm thick W layer is sufficient, at a soldering temperature of approx. 1710° C., to prevent the infiltration of the solder into the graphite or the formation of carbide phases in the solder after dissolution of the barrier layer by the molten solder to a depth of approx. 10 µm, on account of the remaining barrier layer with a thickness of 20-30 µm. If a Ta barrier layer is used, the thickness of the tantalum carbide layer formed as a result of solid-state diffusion, is in the region of 5

μm under standard soldering conditions, compared to an approximately 40 μm thick TiC layer which forms in the case of standard soldering without a metallic barrier layer on account of melting reaction and diffusion. The further growth of the TaC layer in use at high temperatures is also considerably slowed down compared to the TiC. If molybdenum and graphite are soldered using titanium solder, the result is a solder composition Ti—Mo—W (or Ti—Mo—Ta), and the alloy solder which forms solidifies as a solid solution just below the soldering temperature. In the case of the corresponding soldering without a metallic barrier layer, a solder composition of Ti—Mo—C would be established above the approx. 40 μm thick Ti(Mo)C layer, with eutectic solidification approx. 30° C. below the soldering temperature.

In a preferred embodiment of the invention, in the case of composite materials comprising nonmetallic and metallic components, in addition to the nonmetallic component being coated with the barrier layer, the metallic component is also coated with a dividing layer with respect to the solder material. It is preferable for the dividing layer to consist of the same material as the barrier layer. If in each case a single layer of just one metal is provided and if a single-component solder is used at the same time, the soldering process results in the formation of a solder comprising just two chemical elements, in which case the concentration of the layer material which has been dissolved in the solder at a given soldering temperature can be read from the two-component phase diagram.

For example, in the case of coating of both the metallic component made from molybdenum and the nonmetallic component made from graphite with W and in the case of a soldering foil of Zr being used, the solder system which is formed is reduced to the two-component system Zr—W, which melts at approximately 1800° C. in the soldering process and solidifies as a eutectic at approx. 1735° C. By contrast, if the molybdenum alloy TZM (alloying constituents Mo, Ti, Zr, C, O) and graphite are soldered without a coating according to the invention and using a Zr solder, dissolution of both components at approx. 1700° C. leads to the formation of a solder system comprising Zr—Mo—Ti—C—O, which then only solidifies in eutectic form at approx. 1520° C.

To be able to make do with the minimum possible thicknesses of the barrier layer according to the invention, the solubility of the barrier layer according to the invention in the solder should generally be less than 50 atomic %, advantageously less than 10 atomic %. The latter restriction becomes increasingly important if, for reasons of component geometry, local confluence of solder material with increased local dissolution of the layer cannot be avoided.

In general, solder materials are available not just in elemental form but rather also in the form of alloys, in particular as alloys with a eutectic composition, in the form of foils, wires, etc. For example, there are numerous solder compositions comprising Ti, Cu, Ni or Ag as base material. Under certain circumstances, it is in this case advantageously also possible to use alloying constituents which inherently have a high solubility in the base material of the solder as material for the barrier layer, in particular if the solder alloy is substantially saturated with the layer material under soldering conditions.

According to the process of the invention, solder material, solder quantity, material of the metallic barrier layer and if appropriate material of the dividing layer are advantageously adapted to one another in such a way that layer thicknesses for the barrier layer and if appropriate for the dividing layer of 100 μm are sufficient prior to the soldering operation.

In principle, all known coating processes which are suitable for producing, either directly or in combination with subsequent heat treatment, dense layers with good bonding properties, a sufficiently homogenous layer thickness distribution and thicknesses in the range from a few micrometers to several hundred Am, can be used to deposit the barrier and/or dividing layer on the surfaces that are to be soldered. The coating process should be adapted in such a way that under the prevailing conditions, the components that are to be coated do not suffer any disadvantageous changes to their microstructure and dimensions.

Processes which permit substantially directional coating of the part-surfaces which are to be soldered on the nonmetallic and/or metallic components have proven advantageous. Barrier and/or dividing layers which are completely impervious to gas permeation and melt penetration and are dissolved very uniformly, i.e. substantially parallel to the layer/base material interface, by the melt; can be deposited with virtually the theoretical density with the aid of physical vapor deposition (PVD) processes, such as magnetron sputtering. Layers of W, Ta etc. in a thickness of up to approximately 50 μm can be deposited economically using this process. Vacuum plasma spraying (VPS) can advantageously be used for greater layer thicknesses. The densities which can be achieved from a production engineering aspect in this case reach >98% of the theoretical density. Chemical vapor deposition (CVD) is also eminently suitable for the economic production of impervious layers with good bonding properties, for example of high-melting metals.

If necessary from a use perspective, the coating can be restricted to the soldering surface by masks or can be removed again outside the soldering zone by machining before or after the soldering operation.

Joint properties (layer/base material bonding) and layer properties (grain shape and grain size, open porosity; purity) can be optimized by a heat treatment under a vacuum or shielding gas being carried out after the coating operation. Any residual porosity which remains (as for example in the case of VPS layers) in the range of up to approximately 5% can, however, generally be tolerated, since the melt which penetrates into the open pores reaches its equilibrium concentration after a short distance on account of dissolution processes, thereby bringing the dissolution process to a halt.

The process according to the invention can particularly advantageously be used for the production of rotating anodes for X-ray tubes.

Tungsten and tantalum have proven to be particularly advantageous materials for the metallic barrier layer and if appropriate also for the dividing layer when used to join the individual components of rotating anodes of this type, consisting of an Mo-based material, such as for example TZM, as the anode disk, and a graphite backing, by soldering. At the soldering temperatures of 1700°-1750° C. which are customary for Ti solder, tungsten forms a Ti/W melt with titanium as solder material, with a very low W content of 3-6 atomic %, while a solid solution zone with a higher W content (corresponding to the solidus line of the two-component system) comprising approx. 5-10 atomic % W is formed at the interface with the W. In the case of Ti soldering foil thicknesses in the range from 50-100 μm and soldering temperatures between 1700° and 1750° C., W layer thicknesses on the graphite backing of approx. 30-60 μm have proven sufficient to prevent complete dissolution of the barrier layer by the Ti melt. In the case of the simultaneous use of a W dividing layer on the TZM anode disk, the required layer thicknesses for the respective W layers are reduced.

If Zr is used as solder for rotating anodes of this type, tungsten has proven to be a particularly advantageous material for the barrier layer and/or dividing layer.

The W layer forms a eutectic with a melting point of 1735° C. with Zr solder. In this case, 1780-1800° C. have proven suitable soldering temperatures. Approx. 10-12 atomic % W is dissolved during the melting of the Zr. Layer thicknesses for the barrier layer of the order of magnitude of 50-70 μm are sufficient. The Zr—W solder microstructure formed by the barrier layer has significantly finer grains with the process according to the invention than the Mo—Zr microstructure formed by the soldering process according to the prior art without the use of a barrier layer; this applies in particular to the $W_2Zr$ crystals compared to the $Mo_2Zr$ crystals which are otherwise formed.

Another advantageous embodiment of the process according to the invention consists in applying interlayers with special functions. For example, an interlayer can be applied to the non-metallic components prior to the actual metallic barrier layer, and this interlayer likewise remains in the solid state during the soldering process, its role being to improve the joining of the metallic barrier layer to the nonmetallic components and/or its stability, on account of the chemical, physical and mechanical properties of the interlayer. Based for example on the use of a carbon-containing material as nonmetallic component, it is possible first of all for a thin interlayer of a carbide (e.g. NbC or TaC), a carbide-forming metal (e.g. Nb or Ta) or a non-carbide-forming metal (e.g. Ru or Ir) to be deposited as a diffusion barrier layer preventing the diffusion of carbon. Then, the metallic barrier layer acting as a barrier to the solder melt in accordance with the present invention is applied to the abovementioned interlayer. The layer materials for interlayer and barrier layer are adapted to one another and to materials with which they are in contact in such a manner that during the soldering process these layers at least predominantly remain in the solid state.

Accordingly, in a preferred embodiment, Ta is deposited in a thickness of 10-20 μm on carbon-containing nonmetallic components, followed by a 30-60 μm thick layer of tungsten. During the soldering process, an approx. 3-5 μm thick tantalum carbide layer is formed at the interface with the carbon-containing substrate, and even during long-term use of the composite body, this tantalum carbide layer only grows very slowly, resulting in the formation of an even more effective barrier against the diffusion of carbon into the solder material than the $WC/W_2C$ reaction layer which would form during the soldering process without the Ta interlayer and continues to grow during long-term use.

In a further advantageous embodiment of the solder structure according to the invention, a further layer, which contains at least one of the constituents of the solder, is deposited on the metallic barrier layer and/or dividing layer. As a result of the melting of this further layer during the soldering process, it effects delay-free wetting by the solder melt and makes the dissolution reactions caused by the solder melt more uniform over the entire soldering surface. As a result, the local dissolution which is observed in the solder meniscus can also be considerably reduced, and as a consequence the thickness of the metallic barrier layer and if appropriate also of the dividing layer toward the metallic component can be reduced. An additional advantage ensues in the case of solder systems which form a eutectic in the soldering process (e.g. in the Zr—W system), since on account of the additional application of a layer similar to the solder, the solder melting commences without delay immediately above the eutectic melting point, so that the soldering temperature, for example in the case of W—Zr, can be reduced by approximately 30° C., and no further holding time is required when the soldering temperature is reached.

If the soldered join has suitable geometric formations, it may be advantageous for all of the solder material to be deposited, in the form of a layer of the required thickness, on the metallic barrier layer or if appropriate for the solder material to be deposited in approximately equal proportions on barrier layer and dividing layer. This applies in particular to complex soldering surfaces, such as for example screw thread surfaces that are to be soldered.

In addition to rotating anodes for X-ray tubes, the composite bodies produced in accordance with the invention have further advantageous applications in the field of power engineering, in particular fusion technology. The plasma vessels used in research reactors comprise numerous components (divertors, first wall tiles, etc.), which are designed in the form of composites made up of high-melting metals and nonmetallic materials (in particular carbon-containing materials).

It will be clear to a person skilled in the art that the process according to the invention can advantageously also be used for further similar material composites and conditions of use, for example for components from the aeronautical and aerospace industries (heat shields, combustion chambers, etc.) and in high-temperature plant engineering.

In the text which follows, the process according to the invention is explained in more detail on the basis of production examples and figures.

EXAMPLE 1

Anode disks produced by powder metallurgy for rotating anodes made from TZM (molybdenum alloy comprising 0.5% by weight Ti, 0.76% by weight Zr and 0.03% by weight C) with a focal path layer of W5Re (tungsten alloy containing 5% by weight rhenium) on the rearside were soldered to an annular part made from high-performance graphite, to form an X-ray rotating anode. The diameter of the round blanks was 160 mm and the thickness 10 mm. The graphite ring had an external diameter of 156 mm, an internal diameter of 80 mm and a thickness of 45 mm. The graphite ring, in accordance with the process according to the invention, was coated, on the surface to be soldered, with a 50 μm thick layer of W by means of ion-assisted magnetron sputtering (sputter ion plating). The soldering was carried out after the introduction of a 100 μm thick Ti foil with a surface matching that of the graphite ring. The soldering was carried out at 1725° C. under a high vacuum (heat-up rate 15° C./min; holding time 2 min; cooling without temperature control).

According to microsection analysis, after the soldering operation the tungsten barrier layer was still continuously present in a thickness of 35±5 μm. In the region of the solder meniscuses, the residual thickness of the W layer was at least 15 μm. Along the interface between the W layer and the graphite, an approx. 8 μm thick, continuous tungsten carbide layer was formed during the soldering operation as a result of carbon diffusion. The microsection did not reveal any infiltration of the graphite with the Ti solder, or any carbide precipitations in the solder. In accordance with microanalysis under a scanning electron microscope, the solder consisted of a Ti—Mo—W solid solution with Mo and W contents of in each case 3-5 atomic %. The proportion of the surface area in the soldering zone taken up by micropores was approx. 0.4%. There was no evidence of voids.

The soldering zone was tested for the effect of the joining stresses which build up during cooling after soldering by measuring the acoustic emission at the soldered rotating anodes during the cooling phase. This method can be used to detect the occurrence of microcracks or microshearing in the soldered join by means of acoustic signals which they trigger in the high-frequency range. The number of incidences of microdamage detected in this way was between 300 and 500.

EXAMPLE 2

Rotating anodes produced by powder metallurgy for rotating anodes from MHC (molybdenum alloy comprising 19 by weight Hf, 0.7% by weight Zr, 0.1% by weight C and 0.05% by weight O) with a layer of W5Re were soldered to an annular backing of high-performance graphite to form an X-ray rotating anode. The dimensions were the same as those given in Example 1. According to a particularly advantageous embodiment of the process according to the invention, prior to the soldering operation the graphite component was coated by means of vacuum arc ion plating with a 20 µm thick Ta layer as diffusion barrier layer followed by a 30 µm thick W barrier layer. The round MHC blank to be soldered was also coated with a 30 µm dividing layer of W on the side to be soldered. The soldering was carried out using a Ti soldering foil with a thickness of 100 µm, as described in Example 1.

The microsection analysis immediately after soldering revealed an approx. 5 µm thick tantalum carbide layer on the graphite disk, formed through solid-state diffusion between graphite and tantalum layer. This is adjoined by the remaining metallic Ta layer with a residual thickness of approx. 15 µm and the tungsten layer with a residual thickness of approx. 20 µm. The solder layer itself substantially comprises a Ti/W solid solution, with a W content of approx. 5%. Carbide phases were not observed in the solder. The proportion of the surface area formed by micropores was in this embodiment 0.2%. There was no occurrence of macropores.

Measurements of the acoustic emission revealed a number of between 50 and 100 instances of micro damage.

EXAMPLE 3

For comparison purposes, anode disks for rotating anodes were produced in accordance with the prior art. The anode disks were of the same structure as in Examples 1 and 2. Both the graphite parts and the round TZM blanks were used in uncoated form as per the prior art. The soldering was carried out under the same soldering conditions as in Example 1, but using a 250 µm thick soldering foil of titanium, which experience has shown is necessary in order to compensate for the solder loss caused by infiltration of the graphite.

The microsection analysis carried out immediately after soldering revealed a 35 µm thick titanium carbide layer at the titanium solder/graphite interface. Carbide inclusions were also discernible within the solder cross section. The proportion of the surface area formed by micropores in the soldering zone was 3.4%. Evaluation of the acoustic emission showed between 3000 and 5000 incidents of micro damage. This considerably increased number compared to the rotating anodes produced in accordance with the invention is attributable to micro damage to the composite at the interfaces between the titanium carbide layer and the graphite and infiltrated TiC inclusions with the graphite matrix.

The rotating anodes produced as described in Examples 1 to 3 were thermally aged by long-time annealing under a high vacuum (1500° C./20 h), and afterwards microsections of the soldering zone were taken.

Figure 1B:
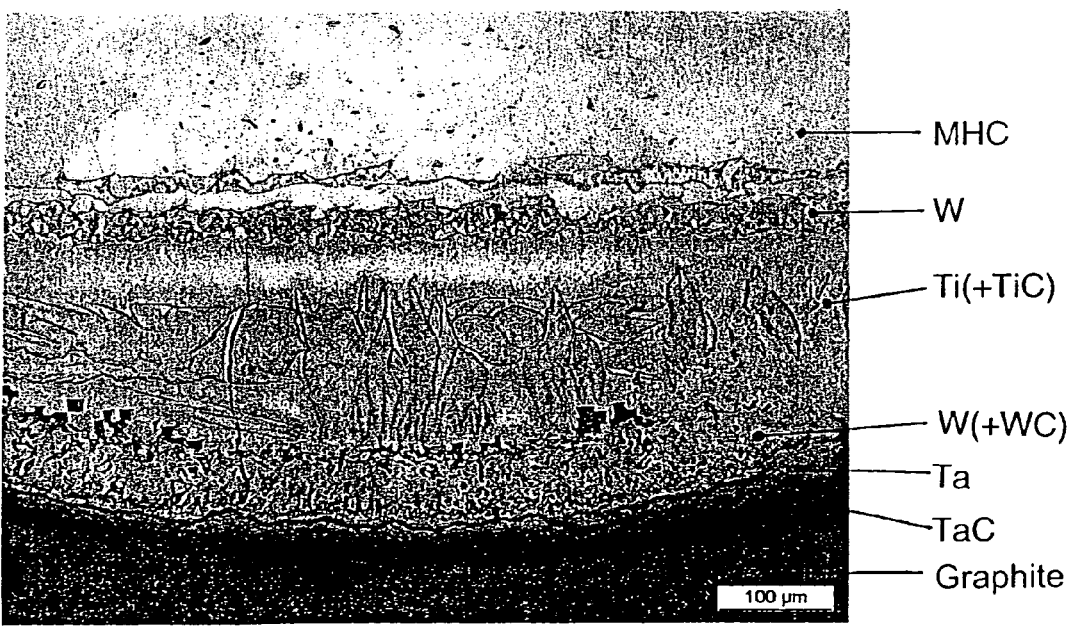
Figure 2:
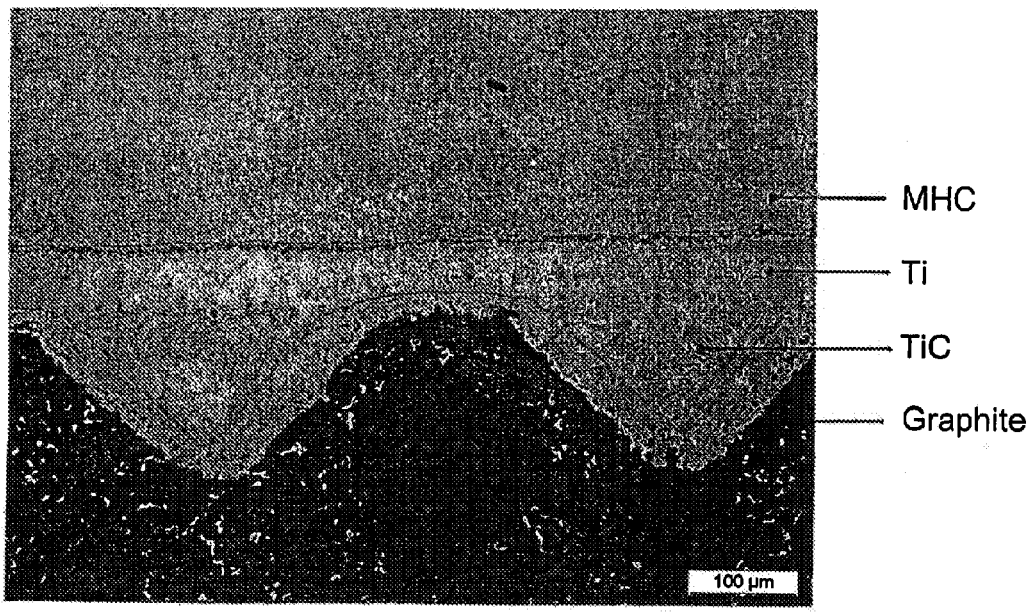
Figure 2:
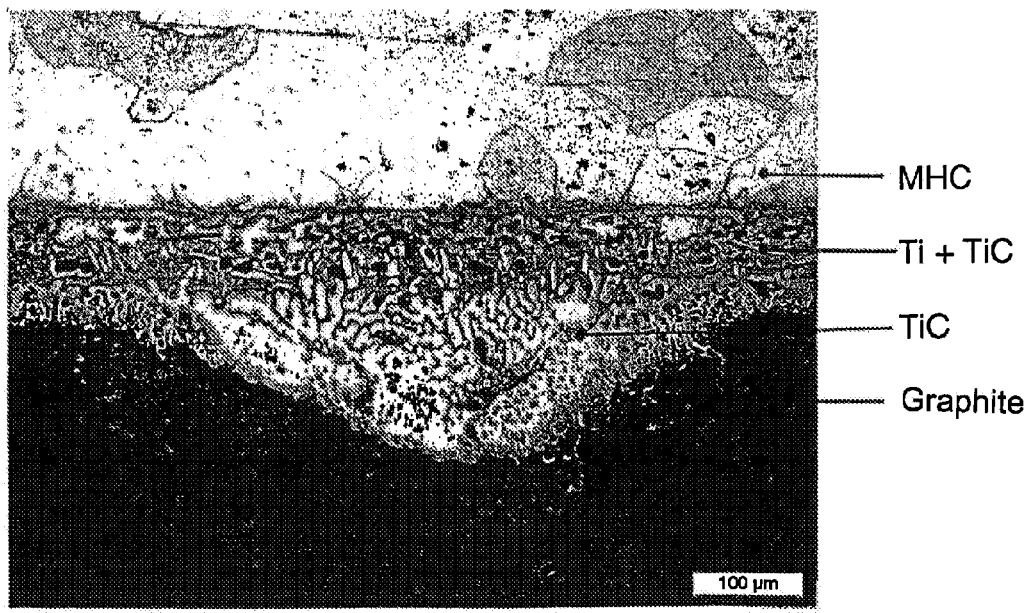

FIG. 1 shows the microsection of the soldering zone of a rotating anode produced in accordance with Example 2 as per the invention, specifically after soldering (FIG. 1a) and after aging for 20 h at 1500° C. (FIG. 1b), in each case under 160 times magnification FIG. 2 shows the microsection of the soldering zone of a reference rotating anode produced in accordance with Example 3 as per the prior art, likewise after the soldering (FIG. 2a) and after aging for 20 h at 1500° C. (FIG. 2b), in each case under 160 times magnification.

It is clearly apparent from FIG. 1 that the soldering zone comprising W/Ti of the rotating anode produced in accordance with the invention is substantially devoid of pores, with only isolated carbide intercalations. By contrast, the soldering zone of the rotating anode produced in accordance with the prior art (FIG. 2) clearly reveals a pronounced porosity and a high proportion of carbide phases in the solder layer.

Figure 3:
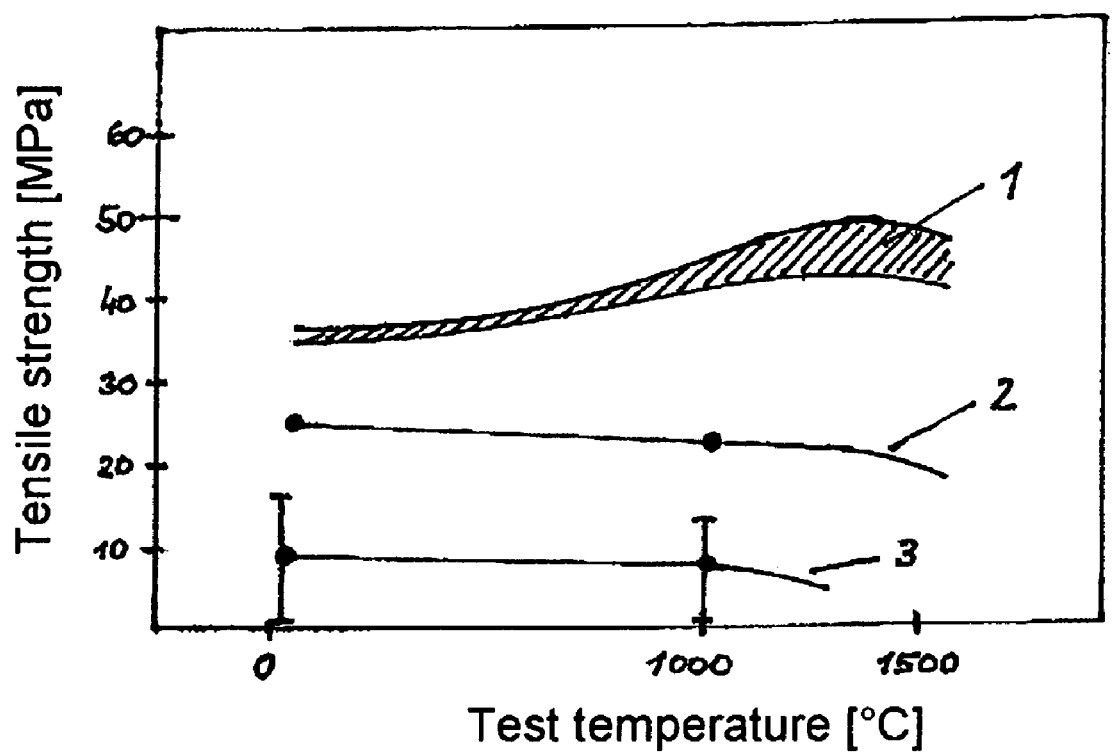

FIG. 3 shows the evaluation of tensile tests carried out on rotating anodes produced in accordance with Example 2 as per the invention and in accordance with Example 3 as per the prior art, in various states of aging.

The curves 1 show the evaluation immediately after soldering of the rotating anodes produced both in accordance with Example 2 and in accordance with Example 3. The curve 2 shows the evaluation of the rotating anodes produced in accordance with Example 2 as per the invention following aging for 20 h at 1500° C. The curve 3 shows the evaluation of rotating anodes which were produced in accordance with Example 3 as per the prior art following aging for 20 h at 1500° C.

The majority of the specimens produced in accordance with Example 3 as per the prior art had become so brittle after aging for 20 h at 1500° C. that they fractured even after the machining required to produce the tensile specimens. Among the remainder, the tensile strength was between 0 and 15 MPa. For the specimens produced in accordance with Example 2 as per the invention, the tensile strength was 24±2 MPa.

The results presented here demonstrate to a person skilled in the art that the composite rotating anodes produced in accordance with the invention have significantly greater abilities to withstand thermal stresses in use and also age significantly more slowly in terms of their strength of join than rotating anodes produced in accordance with the current state of the art.

The examples described here serve only to illustrate the invention.

It will be clear to a person skilled in the art that the process according to the invention can also be successfully used within the teaching of the present patent for joining by soldering a large number of further nonmetallic components to one another or to metallic high-temperature materials in combination with a large number of solders, including multi-component solders.

I claim:

1. A method for producing a composite body capable of withstanding high thermal stresses, the method which comprises:

providing a high-temperature-resistant, metallic or nonmetallic component and a high-temperature-resistant, nonmetallic component;

depositing a metallic barrier layer, configured to be impervious to a solder melt, of one or more carbide-forming elements selected from the group consisting of V, Nb, Ta, Cr, Mo, W, and alloys thereof, on a surface of each nonmetallic component to be soldered; and subsequently joining at least a part of the high-temperature-resistant, metallic or nonmetallic component and at least a part of a high-temperature-resistant, nonmetallic component to one another by high-temperature soldering with a solder material consisting of one or more elements selected from the group consisting of Ti, Zr, and Hf, wherein a content of Ti, Zr, or Hf is greater than 50% by weight; and adapting the soldering operation, the solder material, the barrier layer, and soldering conditions to one another such that, during the soldering operation, the metallic barrier layer remains at least partially in a solid state, and the barrier layer is still present after the soldering operation in a thickness of at least 10 μm at least over a majority of a soldering surface.

2. The method according to claim 1, wherein the metallic barrier layer has a layer thickness in a range from 25 μm-90 μm following the soldering operation.

3. The method according to claim 1, wherein the nonmetallic component is formed of graphite or a carbon-containing material, and wherein the method further comprises, prior to applying the metallic barrier layer, applying an interlayer of a non-carbide-forming metal or of a carbide or nitride of one or more of the metals Ti, Zr, Hf, V, Nb, Ta, Cr, Mo, W to the surface to be soldered.

4. The method according to claim 3, which comprises forming the interlayer with a layer thickness of 5-30 μm.

5. The method according to claim 1, which comprises joining at least a part of a high-temperature-resistant, metallic component to at least a part of a nonmetallic component, and prior to the soldering operation, providing the metallic component with a dividing layer that, during the subsequent soldering process, remains present at least in a thickness of 10 μm in response to a suitable selection of solder material and soldering conditions.

6. The method according to claim 5, which comprises forming the dividing layer with a same structure as the metallic barrier layer on the nonmetallic component.

7. The method according to claim 5, which comprises applying the solder material at least in part as a coating on the metallic barrier layer and/or the dividing layer.

8. The method according to claim 1, which comprises applying the solder material at least in part as a coating on the metallic barrier layer.

9. The method according to claim 1, which comprises joining at least a part of a metallic component comprising W, Mo, or an alloy thereof to at least part of a nonmetallic component comprising graphite or a carbon-containing material using a solder material comprising Ti, and, prior to the soldering operation, applying a 30-80 μm thick barrier layer of W to the nonmetallic component.

10. The method according to claim 9, which comprises, prior to the soldering operation, providing the metallic component with a dividing layer having a composition corresponding to a composition of the barrier layer on the nonmetallic component.

11. The method according to claim 9, which comprises forming the composite body as a rotating anode of an X-ray tube.

12. The method according to claim 1, which comprises joining at least a part of a metallic component comprising W, Mo, or an alloy thereof to at least part of a nonmetallic component comprising graphite or a carbon-containing material using a solder material comprising Ti, and, prior to the soldering operation, applying a 30-80 μm thick barrier layer of Ta to the nonmetallic component.

13. The method according to claim 12, which comprises, prior to the soldering operation, providing the metallic component with a dividing layer having a composition corresponding to a composition of the barrier layer on the nonmetallic component.

14. The method according to claim 12, which comprises forming the composite body as a rotating anode of an X-ray tube.

15. The method according to claim 1, which comprises joining at least a part of a metallic component comprising W, Mo, or an alloy thereof to at least part of a nonmetallic component comprising graphite or a carbon-containing material using a solder material comprising Zr, and, prior to the soldering operation, applying a 30-80 μm thick barrier layer of W or Ta to the nonmetallic component.

16. The method according to claim 15, which comprises, prior to the soldering operation, providing the metallic component with a dividing layer having a composition corresponding to a composition of the barrier layer on the nonmetallic component.

17. The method according to claim 15, which comprises forming the composite body as a rotating anode of an X-ray tube.

18. The method according to claim 1, wherein the high-temperature resistant component is formed of a material selected from the group consisting of V, Nb, Ta, Cr, Mo, W, and Re, and alloys or compounds thereof.

* * * * *